Dec. 5, 1944. R. S. HOPKINS 2,364,362
PHOTOGRAPHIC COPYING APPARATUS
Filed Dec. 31, 1941 2 Sheets-Sheet 1
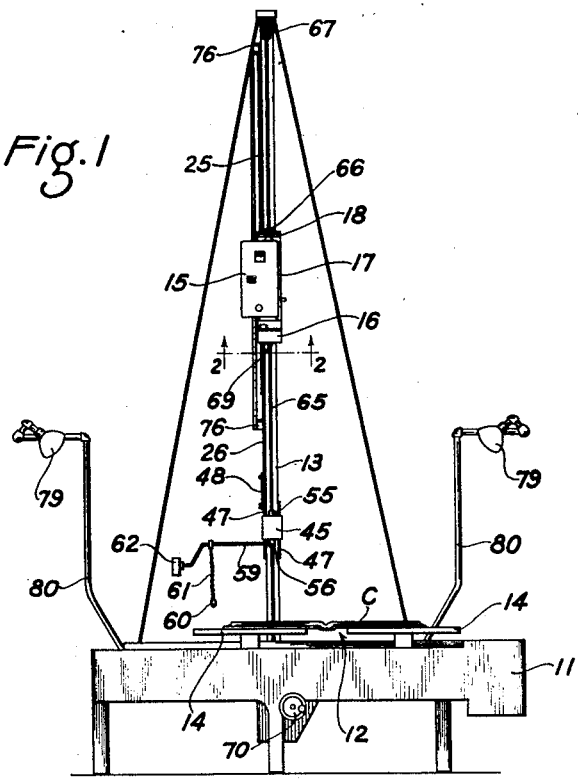
Fig.1
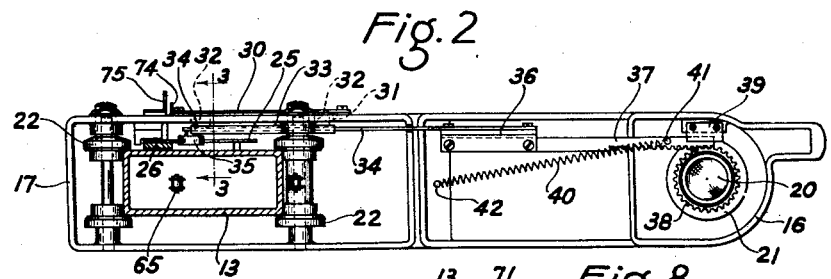
Fig.2
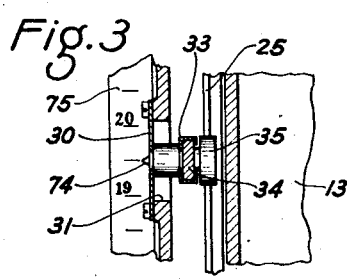
Fig.3
Fig.8
Roy S. Hopkins
INVENTOR
BY
ATTORNEY Dec. 5, 1944.  R. S. HOPKINS  2,364,362
PHOTOGRAPHIC COPYING APPARATUS
Filed Dec. 31, 1941   2 Sheets-Sheet 2
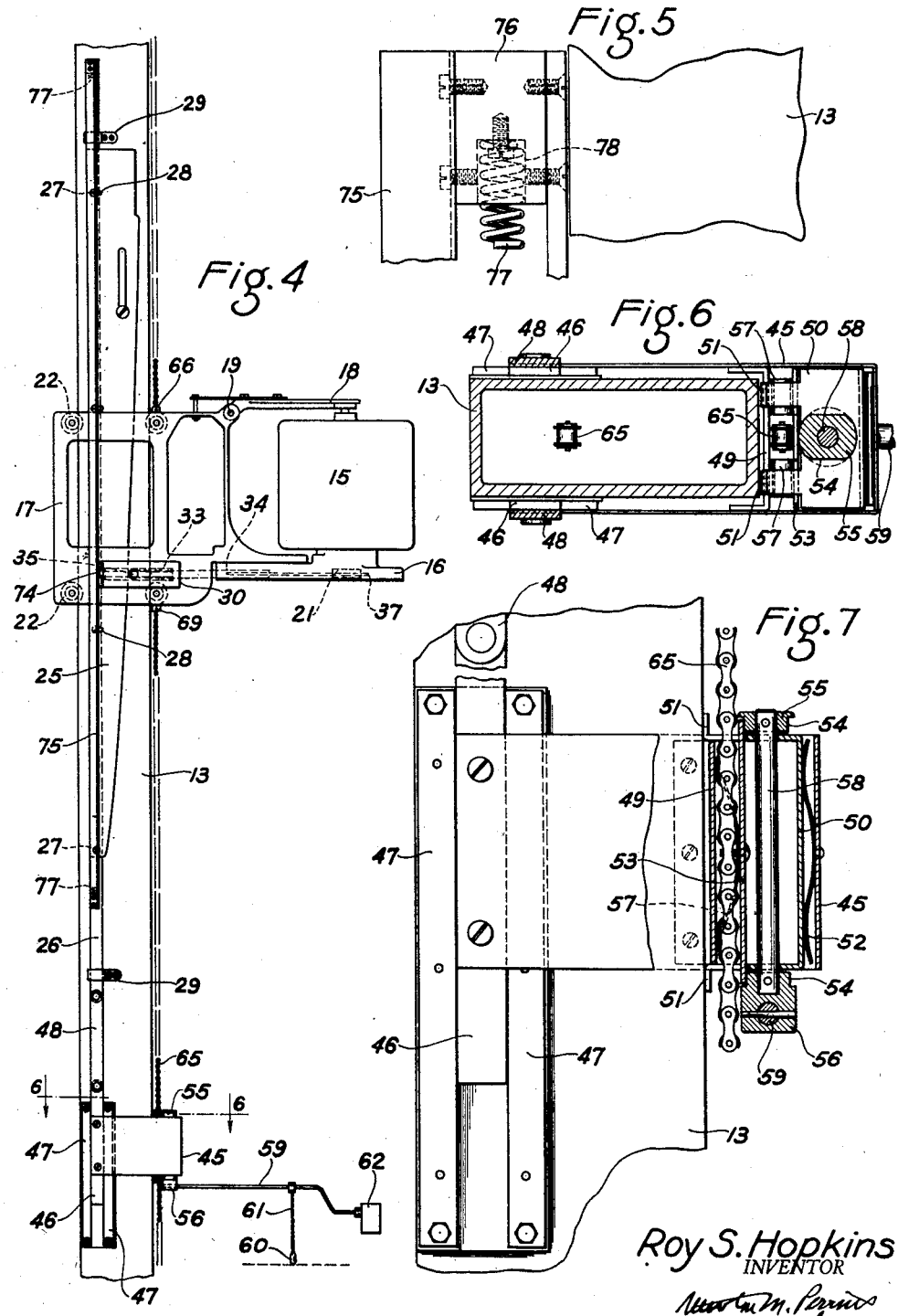
Roy S. Hopkins
INVENTOR
BY
ATTORNEYS Patented Dec. 5, 1944

2,364,362

UNITED STATES PATENT OFFICE 2,364,362

PHOTOGRAPHIC COPYING APPARATUS

Roy S. Hopkins, Rochester, N. Y., assignor to Eastman Kodak Company, Rochester, N. Y., a corporation of New Jersey Application December 31, 1941, Serial No. 425,169

10 Claims. (Cl. 88—24)

This invention relates to photographic copying apparatus and more particularly to the adjustment of a focusing cam with respect to the copy board or the top surface of the copy thereon.

The primary object of the present invention is to provide an autofocus mechanism in which the camera and focusing means can be operated as a unit to properly position them with respect to the copy.

Another object is to provide a mechanism whereby the camera and focusing means can be connected together upon movement of an indicator member with respect to the copy.

And yet another object is to provide an adjustment of the focusing cam with respect to the copy without changing the magnification of the apparatus.

A further object is to provide an attaching means operated by an indicator member that is movable with respect to the copy.

A still further object is to provide a connecting means between the camera and the attaching means whereby movement of an indicator member to an operative position over the copy will connect the camera to the focusing cam, and release the attaching means to permit movement of the camera and focusing cam as a unit with respect to the copy.

And a still further object is to provide cam members on the indicator member to disengage the attaching means from its support to permit movement of the camera and focusing cam when the indicator member is over the copy, and to permit movement of the camera with respect to the focusing cam when the indicator member is in its inoperative position and the attaching means is returned to its support engaging position.

Further objects and advantages will be suggested to those skilled in the art by the description which follows:

The above and other objects are embodied in a photographic copying apparatus having a base on which is mounted a support and a copy holder, a focusing cam movably mounted on the support, a camera also movably mounted on the support, having a focusing lens and movable with respect to the focusing cam, a follower engaging the focusing cam and adapted to focus the lens when the camera is moved with respect to the focusing cam, and a clamping member fixed to the focusing cam and movable therewith and adapted to engage the chain for moving the camera when an indicating member is moved to a position over the copy for connecting the camera and focusing cam in fixed relation to maintain the lens in focus for all magnifications with respect to the copy.

Reference is hereby made to the accompanying drawings wherein like reference characters designate similar parts and wherein:

Fig. 1 is a front elevation of the apparatus described herein;

Fig. 2 is a bottom view taken substantially on the line 2—2 of Fig. 1 showing the connection between the focusing cam and the camera lens in one of its extreme positions;

Fig. 3 is a detail sectional view taken substantially on the line 3—3 of Fig. 2 showing the focusing cam follower and the reduction scale;

Fig. 4 is a partial side elevation of the vertical support and the parts associated therewith;

Fig. 5 is a detail view of the mounting of the reduction scale;

Fig. 6 is a sectional view taken substantially on the line 6—6 of Fig. 4 showing the arrangement for connecting the attaching means to the camera;

Fig. 7 is a side elevation, partially in section, of the attaching means and the indicator or operating member carried thereby, and Fig. 8 is a detail view showing the operating means for moving the camera.

It is well known in the art to move a camera with respect to the copy and at the same time to focus the lens by means of a focusing cam connected to the lens. However, differences in the thickness of the copy will change the photographic plane on the copy holder and will necessitate a further adjustment of the camera to give the desired reduction. The desired reduction will be dependent, therefore, on the skill of the operator to guess at the correct amount to vary the position of the camera to maintain the lens in proper focus with respect to each variation in the photographic plane. To eliminate any errors that may be introduced by the operator, the apparatus about to be described is so arranged that the focusing cam and camera are connected by the movement of an indicator member over the copy to permit adjustment of the camera and focusing cam for any variation in the thickness of the copy.

In the illustrated embodiment of the invention, the photographic copying apparatus comprises a base 11 which has mounted thereon the copy holder 12 and the vertical support 13. The copy holder 12 comprises two support members 14 for the copy C and which are adjustably mounted on the base 11. The camera 15 is mounted on the bracket 16 secured to the carrier 17 and is held in position by the arm 18 pivotably mounted on th ecarrier 17 at 19. The camera 15 is provided with a lens 20 that is mounted in the focusing mount 21 forming a part of the member 16. The carrier 17 is provided with two sets of guide rollers 22 that engage the corners of the vertical support 13, as shown in Fig. 2, to permit easy movement of the camera 15 along the support 13.

The focusing means comprises a focusing cam 25 that is secured to the bar 26 by the screws 27 and is provided with elongated holes 28 for the screws 27 to permit adjustment of the cam in assembly for discrepancies in the focal length of the lens 20. The bar 26 is maintained in position by the cleats 29 fixed to the support 13 to permit movement of the cam plate 25 longitudinally of support 13 for the purpose described hereinafter. A plate 30, which covers an opening 31 in the carrier 17, carries the studs 32 which are secured to a guide member 33 for the slide 34 which has fixed thereto a roller 35 which is in engagement with the cam plate 25, as shown in Figs. 2 and 3. An L-shaped member 36 connects the slide 34 to a rack 37 which engages a gear 38 carried by the focusing mount 21, the rack 37 being held in position by the cleat 39 fixed to the bracket 16. The roller 35 is held in engagement with the cam plate 25 by the spring 40 which is fixed on one end to the pin 41 on the rack 37 and on the other end to the pin 42 on the bracket 16.

The attaching means comprises a U-shaped member 45 that is fixed to the slide member 46 positioned between the gibs 47 on the support 13 and is connected to the bar 26 carrying the cam plate 25 by the connecting link 48. The member 45 has fixed thereto a plate 49 and encloses a U-shaped plate 50 provided with extensions 51, the extensions 51 being normally in engagement with the support 13 due to the action of the leaf spring 22 carried by the member 45. The plate 50 supports a floating plate 53 that is held against the flat portions 54 of the collars 55 and 56 by the leaf springs 57. The collars 55 and 56 are fixed to the shaft 58 that is adapted to be rotated by the rod 59 which is fixed to the collar 56. The rod 59 is movable into and out of a position with respect to the copy and carries a plumb bob 60 secured to a chain 61 which is attached to the rod 59 and also an exposure meter 62, the purpose of the above described structure being apparent from the operation of the apparatus described hereinafter.

The connecting means comprises a chain 65 that has one end secured to the top of the carrier 17 at 66, passes around a sprocket 67 mounted in the top of the support 13, extends through the support 13, passes around a second sprocket 68 located in the base 11, and has the other end secured to the bottom of the carrier 17 at 69. It will be noted from an inspection of Figs. 6 and 7, that the chain 65 passes between the plates 49 and 53 and between the extensions 51 on the plate 50. The carrier 17, which forms a support for the camera 15, is moved by the movement of the chain 65, which, in turn, is moved by the handwheel 70 through the worm 71, the wormwheel 72 and the shaft 73 on which the sprocket 68 is mounted.

The plate 30 has formed on one end thereof a pointer 74 which is adjacent the reduction scale 75, as shown in Fig. 3. The reduction scale 75 is L-shaped and is secured at both ends to the spacers 76 connected to the bar 26, as shown in Fig. 5. The springs 77 are fixed in the recesses 78 in the spacers 76 to act as resilient stops for the carrier 17 which rides along the support 13 between the reduction scale 75 and the cam plate 25, as shown in Figs. 1 and 2.

The operation of the aforementioned apparatus will now be described. The copy C is placed upon the support members 14 which are adjusted to maintain the surface or portion to be copied perfectly flat. Illumination of the copy is provided for by the lamps 79 on the conduits 80 which are fixed to the base 11. At this point, it is necessary to position the camera for the reduction desired, and it is also necessary to position the focusing cam with respect to the top surface of the copy. The camera 15 is moved along the support 13 by turning the handwheel 70, which through the worm 71 and the wormwheel 72 will drive the sprocket 68 thereby moving the carrier 17, which carries the camera 15, through the chain 65 connected thereto. The movement of the camera for the desired reduction is determined by the movement of the pointer 74, which is carried by the carrier 17, with respect to the reduction scale 75. As the camera 15 is moved along the support 13, the roller 35 that is held in engagement with the focusing cam 25 by the spring 40 moves the rack 37 either to the right or left, depending on the direction of movement of the camera 15, to rotate the gear 38 that focuses the lens 20. From this arrangement it is readily appreciated that the lens 20 will always be in focus as the camera 15 is moved with respect to the focusing cam 25. However, after such movement of the camera 15 the lens 20 will not necessarily be in focus with respect to the copy C.

To position the camera with respect to the copy to place the lens in focus, the focusing cam 25 must be moved to its proper position with respect to the copy. The camera 15 and focusing cam 25 are connected so that both may be moved as a unit by the handwheel 70. The focusing cam 25 is connected to the camera 15 by the movement of the rod 59 from the position shown in Fig. 1 to that shown in Fig. 4 where the plumb bob 60 is directly over the copy C. As the rod 59 is moved from its inoperative position, as shown in Fig. 1, to its operative position over the copy, as shown in Fig. 4, the shaft 58 is rotated and the flat portions of the collars 55 and 56 are removed from engagement with the plate 53 to permit the periphery of the collars 55 and 56 to move the plate 53 towards the chain 65 against the action of the spring 57. When the chain 65 has been clamped between the plates 49 and 53, further movement of the collars 55 and 56 moves the shaft 58 and the U-shaped plate 50 away from the plate 53 against the action of the spring 52, thereby disengaging the extensions 51 from the support 13, and at which time, the plumb bob 60 is directly over the copy. The parts will then have assumed the positions as shown in Fig. 6, and the focusing cam 25 will then be connected to the camera 15 by the connecting link 48 secured to the slide member 46 carrying the plate 45 and can be moved therewith.

Movement of the camera 15 and the focusing cam 25 as a unit will have no effect upon the focusing of the lens 20. The focal length of the lens 20, however, is such that the plumb bob 60 must be in contact with the copy to have the lens sharply in focus, so that the movement of the focusing cam 25 and the camera 15 will be governed by the distance the plumb bob 60 is above or below the surface of the copy. When the plumb bob is in contact with the copy, the lens 20 will be in focus and the exposure data can be obtained from the exposure meter 62.

Before the exposure is made the rod 59 must be moved to its inoperative position out of the field of the lens 20. During this movement the extensions 51 engage the support 13 to clamp the plate 45 by the spring 52 to the support 13 so the focusing cam 25 is held in position to permit movement of the camera with respect thereto, the plate 53 is released from its clamping engagement with the chain 65 and brought to rest against the flat portions 54 of the collars 55 and 56. The camera 15 will then be free and can be moved to vary the reduction of the same copy if necessary.

If the thickness or the position of the surface of the copy does not change the camera 15 may be moved to any position along the scale 75 and the lens 20 will always be in focus. However, if the thickness of the copy varies the above described procedure must again be followed to position the focusing cam with respect to the camera before the lens will be in focus. In should be noted that the procedure may be reversed, that is, the camera may be clamped to the focusing cam and raised or lowered until in proper position with respect to the copy, and then released from its connection with the focusing cam to permit movement to the proper position for the desired reduction and correct focusing of the lens.

It is obvious that other mechanical arrangements may be used, and the apparatus described herein is merely illustrative.

Having now particularly described my invention, what I desire to secure by Letters Patent of the United States and what I claim is:

1. In a photographic copying apparatus, the combination with a base including a fixed support and a copy holder, a camera movable with respect to said support and having a focusing lens, and a focusing means movably mounted on said support and connected to said lens for focusing the same when said camera is moved with respect thereto, of an attaching means connected to said focusing means for engaging said support during movement of said camera with respect to said focusing means, and a means between said camera and attaching means and adapted when said attaching means is disengaged from said support to connect said camera and focusing means in a fixed relation for movement with respect to the copy.

2. In a photographic copying apparatus, the combination with a base including a support and a copy holder, a camera movable with respect to said support and having a focusing lens, and a focusing means movably mounted on said support and connected to said lens for focusing the same when said camera is moved with respect thereto, of an attaching means connected to said focusing means and for engaging said support to permit movement of said camera with respect to said focusing means, a manually operable means movable to positions respectively for engaging and disengaging said attaching means with said support, and a connecting means operated by movement of said manually operable means to disengage said attaching means and support and for connecting said camera and focusing means in fixed relation for movement with respect to said support.

3. In a photographic copying apparatus, the combination with a base including a fixed support and a copy holder, a camera movable with respect to said support and having a focusing lens, and a focusing means movably mounted on said support for movement with respect to said copyholder and connected to said lens for focusing the same when said camera is moved with respect thereto, of an attaching means connected to said focusing means and for engaging said support during movement of said camera with respect to said focusing means, an indicating means movable respectively to an indicating position over said copy holder in which said attaching means is disengaged from said support and to an inoperative position in which said attaching means is in engagement with said support, and a connecting means between said camera and attaching means and for connecting said camera and focusing means in fixed relation to maintain said lens in focus for all magnifications when said indicating means is moved to an indicating position with respect to said copy holder.

4. In a photographic copying apparatus, the combination with a base including a support and a copy holder, a camera movable with respect to said support and having a focusing lens, and a focusing means movably mounted on said support and connected to said lens for focusing the same when said camera is moved with respect thereto, of an attaching means connected to said focusing means, an indicating member for operating said attaching means and movable to an indicating position over said copy holder and to an inoperative position, and a connecting means between said camera and attaching means for connecting said camera and focusing means in fixed relation to maintain said lens in focus for all magnifications when said indicating member is moved to an indicating position with respect to said copy holder.

5. In a photographic copying apparatus, the combination with a base including a support and a copy holder, a camera movable with respect to said support and having a focusing lens, and a focusing means movably mounted on said support and connected to said lens for focusing the same when said camera is moved with respect thereto, of an attaching means including a support member fixed to said focusing means, a clamp member carried by said support member and for engaging said support, an indicating member carried by said clamp member and movable respectively to an indicating position over said copy holder and to an inoperative position, cam members mounted on said indicating member to disengage said clamp member from said support when said indicating member is in the indicating position to permit movement of said camera and focusing means, and a resilient member mounted on said support member and for returning said clamp member to its support engaging position when said indicating member is in the inoperative position to permit movement of said camera with respect to said focusing means, and connecting means between said camera and attaching means and for connecting said camera and focusing means in fixed relation to maintain said lens in focus for all magnifications when said indicating member is moved to an indicating position with respect to said copy holder.

6. In a photographic copying apparatus, the combination with a base including a support and a copy holder, a camera movable with respect to said support and having a focusing lens, and a focusing means movably mounted on said support and connected to said lens for focusing the same when said camera is moved with respect thereto, of an attaching means connected to said focusing means and including an indicating means for operating said attaching means and movable to an indicating position over said copy holder and to an inoperative position, a connecting means including a chain member mounted on said support and having both ends fixed to said camera and adapted to be engaged by said attaching means, and an operating means connected to said chain member for moving said camera and focusing means when said indicating member is in the indicating position with respect to said copy holder thereby connecting said camera and focusing means in fixed relation to maintain said lens in focus for all magnifications and for moving said camera with respect to said focusing means when said indicating member is in the inoperative position.

7. In a photographic copying apparatus, the combination with a base including a support and a copy holder, a camera movable with respect to said support and having a focusing lens, and a focusing means movably mounted on said support and connected to said lens for focusing the same when said camera is moved with respect thereto, of an attaching means including a support member fixed to said focusing means, a clamp member carried by said support member and for engaging said support, an indicating member carried by said clamp member and movable respectively to an indicating position over said copy holder and to an inoperative position, cam members mounted on said indicating member and adapted to disengage said clamp member from said support when said indicating member is moved to an indicating position, and a resilient member mounted on said support member and for returning said clamp member to its support engaging position when said indicating member is moved to the inoperative position, a connecting means including an endless member mounted on said support and having both ends fixed to said camera and adapted to be engaged by said clamp member, and an operating means connected to said endless member for moving said camera and focusing means when said indicating member is in the indicating position with respect to said holder thereby connecting said camera and focusing means in fixed relation to maintain said lens in focus for all magnifications and for moving said camera with respect to said focusing means when said indicating member is in the inoperative position.

8. In a photographic copying apparatus, the combination with a base including a fixed support and a copy holder, a camera movable with respect to said support and having a focusing lens, and a focusing means including a focusing cam movably mounted on said support and a follower member in engagement with said cam and connected to said lens for focusing the same when said camera is moved with respect thereto, of an attaching means connected to said focusing means and for engaging said support during movement of said camera with respect to said focusing cam, an indicating means movable respectively to an indicating position over said copy holder in which said attaching means is disengaged from said support and to an inoperative position in which said attaching means is in engagement with said support, and a connecting means between said camera and attaching means and for connecting said camera and focusing means in fixed relation to maintain said lens in focus for all magnifications when said indicating means is moved to an indicating position with respect to said copy holder.

9. In a photographic copying apparatus, the combination with a base including a support and a copy holder, a camera movable with respect to said support and having a focusing lens, and a focusing means including a focusing cam movably mounted on said support and a follower member in engagement with said cam and connected to said lens for focusing the same when said camera is moved with respect thereto, of an attaching means including a support member fixed to said focusing cam, a clamp member carried by said support member and for engaging said support, an indicating member carried by said clamp member and movable respectively to an indicating position over said copy holder and to an inoperative position, cam members mounted on said indicating member and adapted to disengage said clamp member from said support when said indicating member is in the indicating position to permit movement of said camera and focusing cam, and a resilient member mounted on said support member and for returning said clamp member to its support engaging position when said indicating member is in the inoperative position to permit movement of said camera with respect to said focusing cam, and a connecting means between said camera and attaching means and for connecting said camera and focusing cam in fixed relation to maintain said lens in focus for all magnifications when said indicating member is moved to an indicating position with respect to said copy holder.

10. In a photographic copying apparatus, the combination with a base including a support and a copy holder, a camera movable with respect to said support and having a focusing lens, and a focusing means including a focusing cam movably mounted on said support and a follower member in engagement with said cam member and connected to said lens for focusing the same when said camera is moved with respect thereto, of an attaching means including a support member fixed to said focusing cam, a clamp member carried by said support member and for engaging said support, an indicating member carried by said clamp member and movable respectively to an indicating position over said copy holder and to an inoperative position, cam members mounted on said indicating member and adapted to disengage said clamp member from said support when said indicating member is in the indicating position to permit movement of said camera and focusing cam, and a resilient member mounted in said support member and for returning said clamp member to its support engaging position when said indicating member is in the inoperative position to permit movement of said camera with respect to said focusing cam, a connecting means including a chain member mounted on said support and having both ends fixed to said camera and adapted to be engaged by said clamp member, and an operating means connected to said chain member for moving said camera and focusing cam when said indicating member is in the indicating position with respect to said copy holder thereby connecting said camera and focusing cam in fixed relation to maintain said lens in focus for all magnifications and for moving said camera with respect to said focusing cam when said indicating means is in the inoperative position.

ROY S. HOPKINS.